US006139315A

United States Patent [19]

Berglund et al.

[11] Patent Number: 6,139,315

[45] Date of Patent: Oct. 31, 2000

[54] RECUPERATOR FOR FURNACES

[75] Inventors: Göran Berglund, Sandviken; Jonas Nilsson, Göteborg, both of Sweden

[73] Assignee: Sandvik AB, Sandviken, Sweden

[21] Appl. No.: 09/331,209

[22] PCT Filed: Dec. 18, 1997

[86] PCT No.: PCT/SE97/02150

§ 371 Date: Sep. 2, 1999

§ 102(e) Date: Sep. 2, 1999

[87] PCT Pub. No.: WO98/27017

PCT Pub. Date: Jun. 25, 1998

[30] Foreign Application Priority Data

Dec. 19, 1996 [SE] Sweden .................................. 9604674

[51] Int. Cl.[7] ........................................................ F28D 7/14

[52] U.S. Cl. .......................... 432/223; 432/209; 432/224; 165/142

[58] Field of Search .................................... 432/209, 223, 432/224; 165/142; 110/233

[56] References Cited

U.S. PATENT DOCUMENTS

| | | | |
|---|---|---|---|
| 3,586,098 | 6/1971 | Wellensiek | 165/142 |
| 4,106,556 | 8/1978 | Heyn et al. | 465/142 |
| 4,222,824 | 9/1980 | Flockenhaus et al. | 432/223 |
| 4,269,266 | 5/1981 | Coates, Jr. et al. | 165/142 |
| 4,560,349 | 12/1985 | Vider | 432/223 |
| 4,642,864 | 2/1987 | Metcalfe et al. | 29/157.3 R |

FOREIGN PATENT DOCUMENTS

| | | |
|---|---|---|
| 931111 | 7/1963 | United Kingdom . |

*Primary Examiner*—Pamela Wilson
*Assistant Examiner*—Gregory A. Wilson
*Attorney, Agent, or Firm*—Burns, Doane, Swecker & Mathis, L.L.P.

[57] ABSTRACT

A recuperator for furnaces includes a set of tubes, which are installed in a secondary chamber (1) which is located behind a main combustion chamber of the furnace and through which hot fumes can pass from the main combustion chamber towards an outlet. The task of the tubes is to recuperate thermal energy from the fumes by bringing a combustion gas to pass through the tubes on its way to burners in the main combustion chamber. The different tubes of the tube set are designed as individual units (8) each one of which is removably inserted in the secondary chamber (1) through holes in the walls (4) thereof. In the mounted condition each tube has a closed portion projecting into the secondary chamber as well as a portion projecting from the outside of the walls of the secondary chamber, the latter portion having inlets and outlets for cold and preheated combustion gas respectively.

4 Claims, 3 Drawing Sheets

17' 13 15' 14' 17 15 14 A A 9 10 11 20 8 18 16 12 19

RECUPERATOR FOR FURNACES

TECHNICAL FIELD OF THE INVENTION

This invention refers to a recuperator for furnaces comprising a set of tubes installed in a secondary chamber, which is located behind a main combustion chamber of the furnace and defined by at least partly refractory walls and through which fumes can pass from the main combustion chamber towards an outlet, said tubes being provided to recuperate thermal energy from the fumes, more specifically by bringing a combustion gas, e.g. air, oxygen and/or natural gas, to pass therethrough on its way to burners in the main combustion chamber.

BACKGROUND OF THE INVENTION AND PRIOR ART

Glass for industrial purposes is usually manufactured in continuously operative furnaces of the tank type. Such glass furnaces include a long main chamber in which a suitable number of burners are mounted in order to melt the glass-forming raw material that is charged at one end of the chamber, the molten glass being discharged at the opposite end. Behind the main combustion chamber there is provided a secondary chamber through which the fumes generated by the burners pass before they are blown out in the open through a chimney or the like. For the burners fossil fuels, such as fuel oil or natural gas, are most often used. These fuels are burned while generating flames in the area above the bath of liquid glass that is continuously formed in the main combustion chamber or melting chamber. The fumes leaving this melting chamber have a very high temperature, e.g. within the range of 1400–1700° C. In order to recover the thermal energy of these hot fumes as far as possible a recuperator is provided in the secondary chamber. By means of this recuperator part of the thermal energy can be transferred to the combustion gases which are necessary for the burning of the fuel in the burners and which are led to the burners from the outside through one or several feeding conduits. Previously known recuperators for this purpose are in the form of so called radiation baskets which are mounted in the upper part of a vertical shaft included in the secondary chamber. These baskets comprise a great number of rather slender tubes which are held together in a basket-like configuration and which are hung up in the vertical shaft by means of special means of attachment in the upper part of the shaft. Through a collecting tube the combustion air or combustion gas is led through the tubes of the basket, said air being preheated before it reaches the burners in the melting chamber. In practice said radiation baskets are, however, associated with several disadvantages. One disadvantage is that the attachment means of the collector tube and the individual radiation tubes have to be carefully protected by means of a refractory mass in order not to be attacked by the fumes. Furthermore, the installation of the basket calls for relatively expensive arrangements in order to minimize the thermal stresses in the structure due to thermal expansion. Another severe disadvantage is that the basket in its entirety has to be disassembled and removed from the secondary chamber in case anyone of the tube members of the basket structure would fail, e.g. due to leakage. This means that the furnace, which usually should operate continuously during periods in the range of 5 to 8 years, has to be put out of operation during the time necessary for repairing the basket. Such breaks in the continuous production are extremely costly.

A problem in connection with the use of air as a combustion gas is that nitrogen oxide is formed during the combustion, such nitrogen oxide being environmentally noxious. In order to eliminate this problem the use of oxygen instead of air for the combustion has started in recent years. Also in connection with the use of oxygen as a combustion gas there is a need of preheating the gas by utilizing the inherent heat of the hot fumes. However, a change-over to preheated oxygen cannot be carried out quite easily. Thus oxygen is a reactive and agressive gas and at the same time the material in the recuperator tubes are subjected to very high temperatures e.g. 1000° C. or more. In previously known recuperator tubes either a ferritic stainless steel having a high content of chromium of the type 27 Cr, the remainder Fe, or an austenitic steel of the type 21 Cr, 11 Ni, Si, REM, the remainder Fe, have been used. The advantage of the first mentioned steel type is that is has a good resistance against attacks from the fumes, even upon a rich presence of sulphur compounds leading to sulphuration due to the formation of sulphate on the tube walls. A disadvantage of this steel type is, however, that it has a low creeping strength. On the other the austenitic steel has good creeping properties, but this type of steel does not, however, withstand the fumes in a satisfactory manner. This is true for all alloys having a high content of nickel. In case oxygen would be fed through tubes with such a high temperature as 1000° C. or more there would in both cases be an obvious risk of shell formation in the surface layer of the tube material due to oxidation. The use of preheated oxygen as a combustion gas also involves additional security requirements owing to the face that the gas is very reactive and can easily be ignited with an explosive progress upon possible leakages.

OBJECTS AND FEATURES OF THE INVENTION

The present invention aims at obviating the above mentioned problems and disadvantages of previously known recuperators and provide an improved recuperator. Accordingly a primary object of the invention is to provide a recuperator which, at need, allows removal of individual imperfect tubes even while the manufacture is in progress. A further object is to provide a recuperator the tubes of which can be installed in a simple and optimal manner in the secondary chamber of the furnace. Another object of the invention is to provide a recuperator which during operation has a good security against leakage. It is also an object of the invention to provide a recuperator which in a reliable manner admits the use of oxygen as a combustion gas for the burners in the main chamber or melting chamber.

According to the invention at least the primary object is attained by means of the features stated in the characterizing clause of claim 1. Advantageous embodiments of the invention are further defined in the dependent claims.

BRIEF DESCRIPTION OF THE APPENDED DRAWINGS

In the drawings:

FIG. 1 is a longitudinal section partially illustrated in side elevation through a separate tube unit being a part of a recuperator according to the invention, FIG. 2 is a cross section A—A in FIG. 1, FIG. 3 is a front view showing an alternative embodiment of a separate tube unit according to the invention, FIG. 4 is a side elevation of the tube unit according to FIG. 3, FIG. 5 is a horisontal view from above of the tube unit according to FIGS. 3 and 4, FIG. 6 is a partial section through a secondary chamber included in a glass melting furnace, illustrating an embodiment of a recuperator having vertically mounted tube units, FIG. 7 is a plan view therefor FIG. 6, FIG. 8 is a partial section (corresponding to FIG. 6) through a secondary chamber having an alternative recuperator comprising tube units which are horizontally mounted, and FIG. 9 is a side elevation from the same recuperator seen from the left in FIG. 8.

DETAILED DESCRIPTION OF PREFERRED EMBODIMENTS OF THE INVENTION

Figure 1:
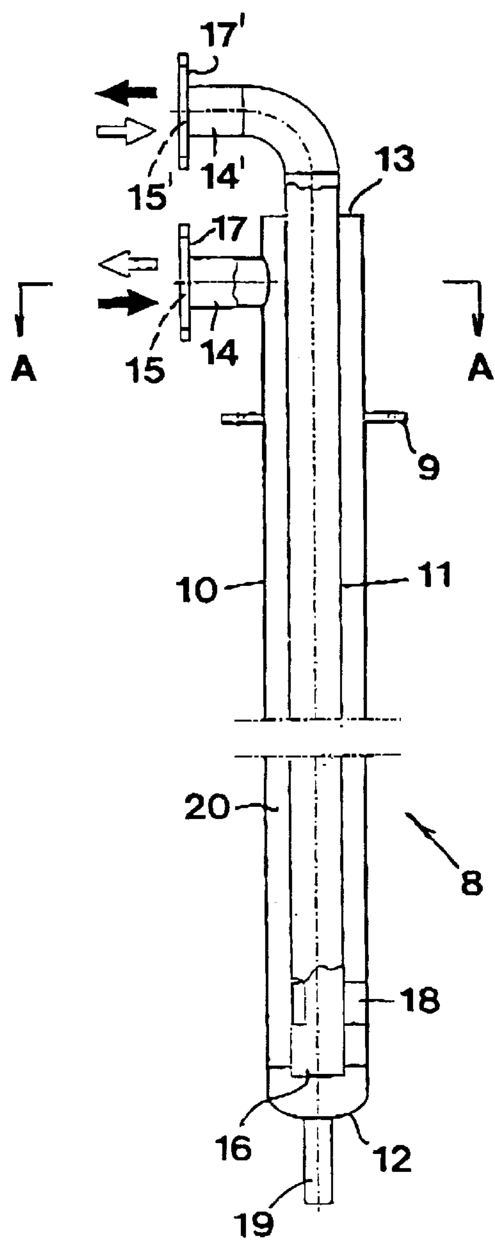

In FIGS. 6–9 numeral 1 generally designates a secondary chamber which is included in a furnace, e.g. a glass furnace of the tank type, which also includes a melting chamber or main combustion chamber (not shown). Secondary chamber 1 comprises a vertical shaft 2 as well as a horizontal passage 3 that is associated to a rear section of the melting chamber in front. The secondary chamber 1 is entirely or partially defined by refractory walls 4, preferally in the form of brick walls. At top the vertical shaft 1 has a roof 5 in which there is a central opening 6 to which a chimney 7 or the like is connected.

Previously known recuperators, which have always been installed in the vertical shaft of the secondary chamber, have been in the form of a basket like structure comprising a plurality of rather slender tubes which have been held together by means of stiff upper and lower members included in the basket. If, therefore, leakage has occurred in anyone of the different tubes it has been necessary to interrupt the operation of the furnace either in order to completely remove the basket from the secondary chamber or in order to admit work within this chamber.

Figure 6:
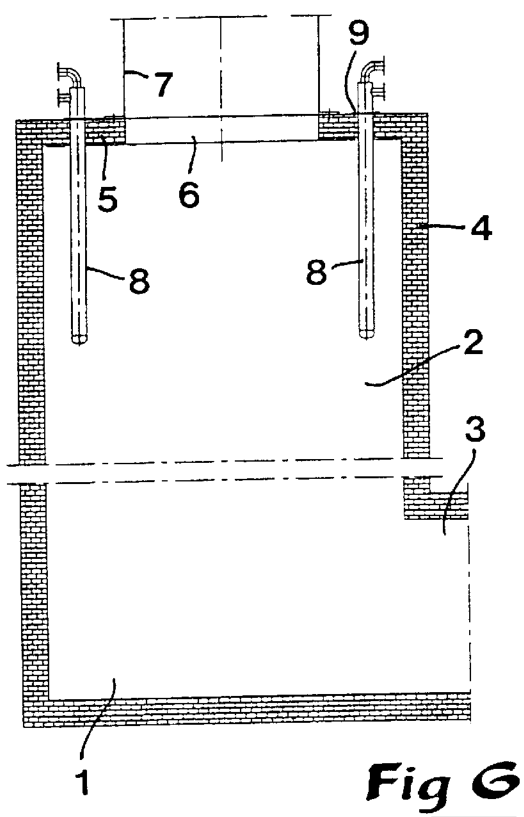
Figure 7:
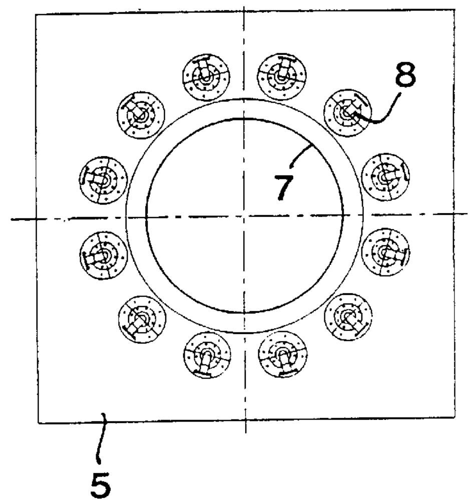

In accordance with the present invention the various tubes in a set of tubes which together form a recuperator, are designed as individual units which are separately removably inserted in the secondary chamber through holes in the walls thereof. In FIGS. 6 and 7 an embodiment is shown in which such tube units 8 are vertically mounted in the secondary chamber. More specifically the tube units are put into the chamber through holes in the above mentioned roof 5 and provided with flanges 9 the task of which is to cover the holes and to serve as attachments which are capable of carrying the load of the part of the tube unit which hangs freely in the chamber. As shown in FIG. 7 a plurality of tube units 8 may be equidistantly distributed in close vicinity of the outlet opening 6. Thus, twelve tube units mounted around the opening are shown in the embodiment of FIG. 7.

Figure 2:
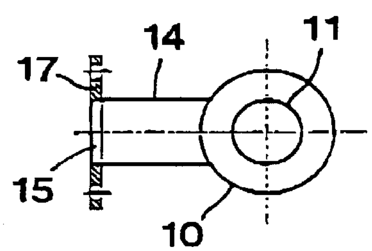

Reference is now made to FIGS. 1–2 which illustrate a first, preferred embodiment of a single tube unit 8 according to the invention. In this case the tube unit is composed of a comparatively wide outer tube 10 and an inner tube which is concentrically located within the same and which has a considerably smaller diameter than the outer tube. At a front end the outer tube is closed by means of a dome-shaped end member 12. Also at the opposite, read end the outer tube 10 is closed by means of an end plate 13, which, however, is penetrated by the inner tube 11. In the vicinity of this rear end plate 13 the outer tube has a lateral connecting branch 14 the free end of which presents an opening 15 through which combustion gas can pass either inwardly or outwardly.

The inner tube 11 is open at the two opposite ends thereof. More specifically a front opening 16 opens in the closed front end portion of the outer tube, while a rear opening 15' is included in a connecting branch 14' which is connected to tube 11 by a tube bend, the connecting branch 14' being provided with a flange 17'. Also the connecting branch 14 is provided with an analogous flange 17. A suitable number of radial spacers 18 are advantageously provided in the annular gap 20 between the outside of inner tube 11 and the inside of outer tube 10 in order to keep the inner tube firmly in place within the outer tube. From the free front end portion of the outer tube a projection 19 may protrude. By means of said projection longish tube units can be supported when they are horisontally mounted.

By means of the flanges 17, 17' the tubes 10 and 11 respectively can be connected either to collecting tubes or to separate tubes in order to conduct, on one hand, cold combustion gas from a source to the tube unit shown, and conduct, on the other hand, preheated combustion gas from the tube unit to the burner in question in the melting chamber. In case the opening 15 in connecting branch 14 serves as an inlet for incoming combustion gas the analogous opening 15' of inner tube 11, of course, serves as an outlet (and vice versa).

Though one single inner tube 11 only is shown within the outer tube 10 it is conceivable to provide, within the outer tube, a tube assembly comprising a plurality of individual tube members which communicate with each other. It is also conceivable to use a screw-shaped tube instead of a straight inner tube.

It is particularly pointed out that the entire part of the outer tube 10 of the tube unit which extends from the attachment flange 9 to the free end portion 12 and which is inserted in the secondary chamber 1 is completely closed outwards. The inlet and outlet openings 15, 15' and the coupling flanges 17, 17' associated therewith (at which flanges there is a risk that possible leakage occurs) are on the contrary, located behind the flange 9, wherefore the same in the installed operative condition are positioned outside the walls of the secondary chamber.

The function of the tube unit 8 (shown in FIGS. 1 and 2) during operation is evident. Suppose that the combustion gas, e.g. air, oxygen and/or natural gas, is conducted in a cold state into the inner tube 11 through the opening 15' serving as an inlet, as indicated by a white arrow in FIG. 1. Then the gas will at first pass through the inner tube and thereafter through the annular gap 20 between the outer and inner tubes so as to finally be carried out through the outlet opening 15. When the gas passes through the inner tube an introductory heating thereof takes place inasmuch as the inner tube is heated to an appreciable temperature, e.g. within the range of 500 to 700° C. Upon continued passage through the annular gap 20 the heating of the gas is intensified because of the fact that the outer tube 10 is of very high temperature (most often about 1000° C. or more) since the same is surrounded by the fumes emanating from the melting chamber.

Figure 3:
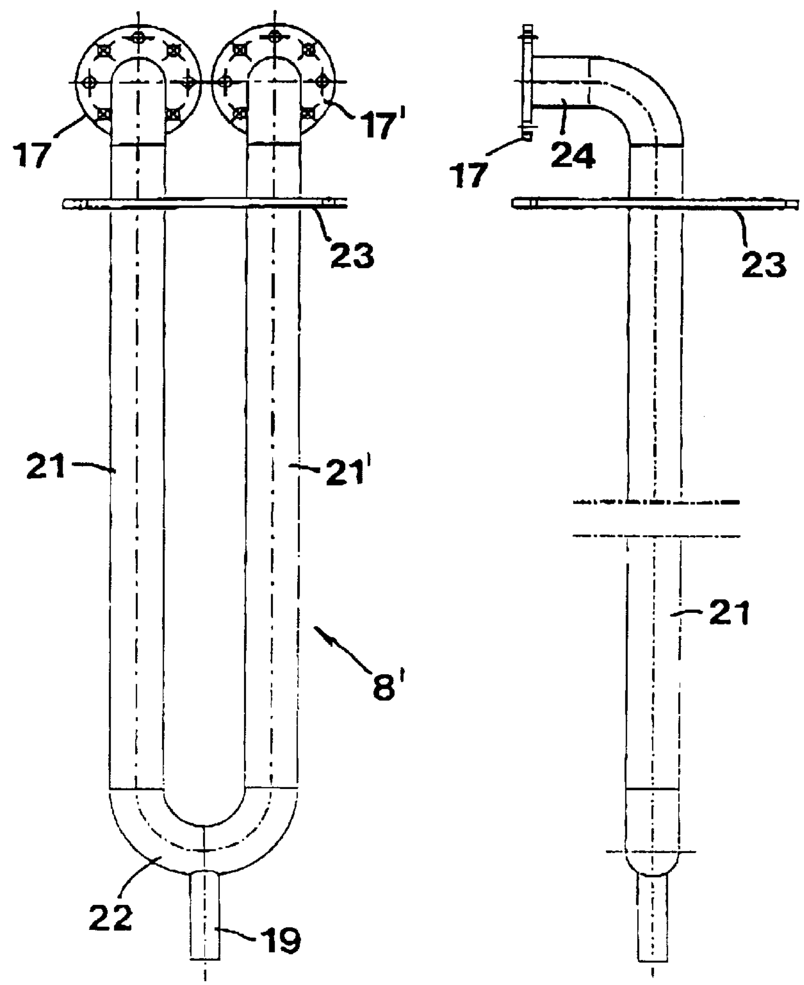
Figure 5:
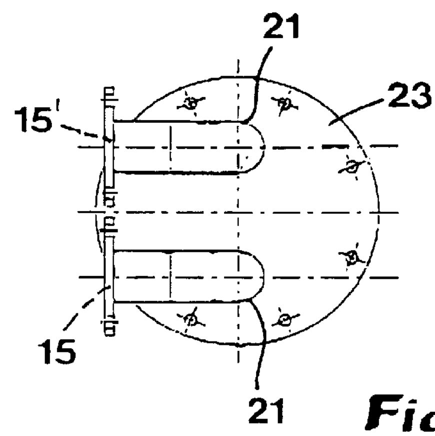

Reference is now made to FIGS. 3–5 which illustrate an alternative embodiment in which the individual tube unit 8' is in the form of a U-shaped tube comprising two legs 21, 21' which are parallel with each other and interconnected by means of a closed U-bend 22 at the front end of the unit. These two tube legs penetrate a common plate 23 which, like the flange 9 in the embodiment according to FIGS. 1 and 2, has for its task to cover a wall hole and to serve as a mounting flange for the unit. At rear ends the tube legs pass, in this case, via tube bends into lateral branches 24 which are provided with coupling flanges 17, 17'. In this case a cold combustion gas is fed into one of the tube legs so as to pass out from the other one while successively being heated from the inlet towards the outlet. Also in this embodiment the part of the tube unit which extends from plate 23 to the free front end, is completely closed.

As a material in the described tube units, may, according to the invention, advantageously be used an aluminiumbearing, iron-based alloy which in a manner known per se is produced in a powder metallurgical manner, e.g. in the form of a stainless steel of the type 22 Cr, 4 à 6 Al and the remainder Fe. A tube material which is especially preferred for the purpose, is described in SE 8800914-7. This material is composed of an iron base alloy having 10–40 percent by weight of chromium, 2–10 percent by weight of aluminium, at most 5 percent by weight of each one of cobalt, nickel, silicium, manganese, zircon, and titanium, though in all maximum 10 percent by weight, and totally less than 2 percent by weight of additives of nitrogen, carbon and/or yttrium, hafnium, as well as metals in the group of rear alcaline earths, and additionally 0,02–0,1 percent by weight of oxygen fixed in the form of oxides or other refractory impurities, the remainder iron, the oxides being present as dispersed particles having an average diameter of 1000 to 3000 A.U. evenly distributed in the material, the axles in the grains in the metallic phase being in all essentials similarly oriented. After formation into tubes and heat treatment at 1050° C. at least, this alloy will mainly contain very longish grains having a length of at least 5 mm and a ratio length/cross section of at least 10 to 1.

Though the alloy according to SE 8800914-7 was originally intended to be used as an electric resistance material, it has turned out that the same is very suitable as a material for recuperator tubes of the present type. Accordingly the material has a very good creep strength even at high temperatures and at the same time the oxidation and sulphuration respectively of the metal is as goods as non-existent even if the material gets in contact with agressive oxygen being preheated to high temperatures. The good creeping strength means that the tube units will resist great mechanical stresses, whereby surface effects in the order of up to 50 $kW/m^2$ are made possible in connection with the heat transmission. In order words the above mentioned material allows a considerably higher metal temperature than the traditional types of steel.

Figure 8:
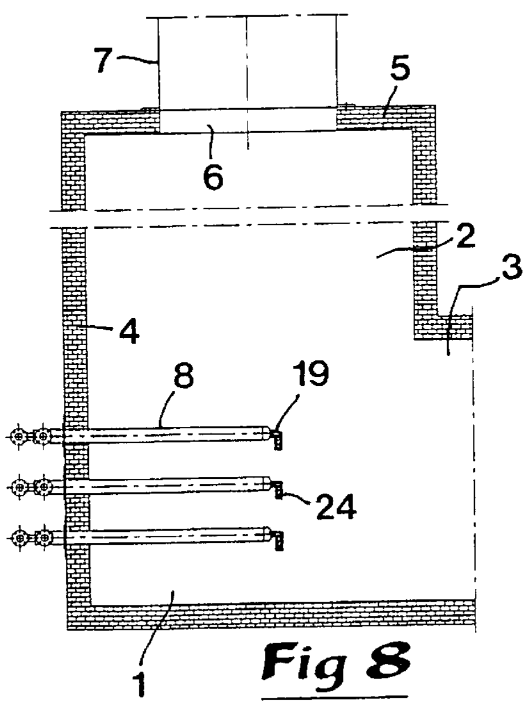
Figure 9:
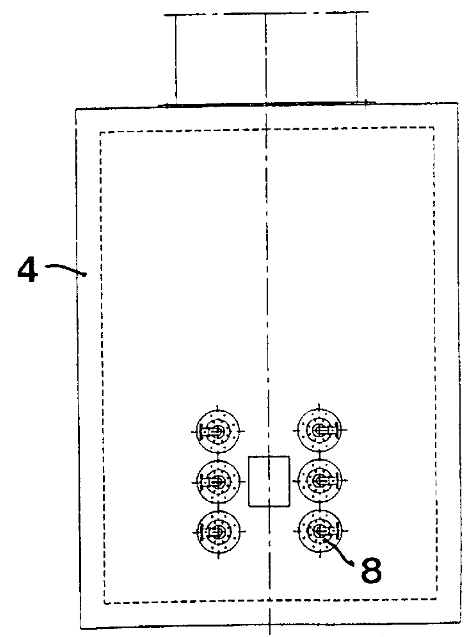

FIGS. 8 and 9 illustrate an alternative embodiment in which the tube units 8 are horizontally installed by being inserted in the chamber through holes in a vertical chamber wall. In case the tube units are especially longish the projections 19 will contribute to the support thereof, more specifically by being arranged resting on transverse bars 24 which extend across the secondary chamber between opposite chamber walls.

The field of application of the recuperator according to the invention is not limited to glass furnaces only. Thus the present recuperator can be used in any furnace or oven in which it is desirable to recover heat energy from one or more heat energy sources in a combustion chamber.

What is claimed is:

1. A recuperator for furnaces, comprising:

a set of tubes installed in a secondary chamber which is located behind a main combustion chamber of the furnace and defined by at least partly refractory walls and through which hot fumes can pass from the main combustion chamber towards an outlet, said tubes being provided to recuperate thermal energy from the fume, wherein tubes of the tube set are designed as individual units which are separately inserted in, and removable from, the secondary chamber through holes in the walls thereof, each one of the tubes in an installed condition, has a closed portion disposed in the secondary chamber as well as a portion projecting outwardly from the outside of the walls of the secondary chamber, the latter portion having an inlet and an outlet for unheated and preheated combustion gas respectively, wherein the individual tube unit is in the form of a U-shaped tube having two legs which are interconnected by a closed U-shaped bend at a front end of the tube unit, and which present openings at rear ends serving as inlets or outlets for the combustion gas, the two tube legs penetrating, in the vicinity of said rear end, a common attachment plate provided to cover the wall hole through which the unit is inserted in the secondary chamber.

2. The recuperator according to claim 1, wherein the individual tube unit is composed of a wide outer tube having an opening serving as an inlet or outlet for the combustion gas, and at least one slender tube, which is mounted within the outer tube and has an opening serving as an outlet or inlet for the combustion gas, and a mouth positioned within the outer tube, the combustion gas, which is fed inwardly through one of the openings and outwardly through the other one, being forced to pass a gap between the outside of the inner tube and the inside of the outer tube so as to be preheated by heat transmission from the hot fumes via the outer tube.

3. The recuperator according to claim 1, particularly for preheating oxygen as a combustion gas, wherein said tube units are completely or partly made of an aluminum bearing, iron-based alloy which is produced in a powder metallurgical manner.

4. The recuperator according to claim 3, wherein said alloy includes 10–40 percent by weight of chromium, 2–10 percent by weight of aluminum, at most 5 percent by weight of each one of cobalt, nickel, silicium, manganese, zircon, and titanium, though in all maximum 10 percent by weight, and totally less than 2 percent by weight of additives of nitrogen, carbon and/or yttrium, hafnium, as well as metals in the group of rear alkaline earths, and additionally 0.02–0.1 percent by weight of oxygen fixed in the form of oxides or other refractory impurities, the remainder iron, the oxides being present as dispersed particles having an average diameter of 1000 to 3000 A.U. evenly distributed in the material, the axles in the grains in the metallic phase being in all essentials similarly oriented, the alloy after formation into tubes and heat treatment at 1050° C. at least, mainly containing very longish grains having a length of at least 5 mm and a ratio length/cross section of at least 10 to 1.

* * * * *